(12) United States Patent
Klemka

(10) Patent No.: US 12,174,058 B2
(45) Date of Patent: Dec. 24, 2024

(54) HARD MOUNTED NOZZLE ACCELEROMETER

(71) Applicant: Eric Klemka, Findlay, OH (US)

(72) Inventor: Eric Klemka, Findlay, OH (US)

( * ) Notice: Subject to any disclaimer, the term of this patent is extended or adjusted under 35 U.S.C. 154(b) by 0 days.

(21) Appl. No.: 18/467,184

(22) Filed: Sep. 14, 2023

(65) Prior Publication Data

US 2024/0003736 A1  Jan. 4, 2024

(51) Int. Cl.
*G01H 1/00* (2006.01)
*B33Y 50/02* (2015.01)
*G01H 13/00* (2006.01)

(52) U.S. Cl.
CPC ............... *G01H 1/00* (2013.01); *B33Y 50/02* (2014.12); *G01H 13/00* (2013.01)

(58) Field of Classification Search
CPC ..... B29C 64/209; B29C 64/393; B33Y 10/00; B33Y 30/00; B33Y 50/02; G01H 13/00
See application file for complete search history.

(56) References Cited

U.S. PATENT DOCUMENTS

| | | | |
|---|---|---|---|
| 10,889,068 B1* | 1/2021 | Batchelder | B33Y 30/00 |
| 2014/0042657 A1* | 2/2014 | Mulliken | B29C 64/118 |
| | | | 425/113 |
| 2016/0039148 A1* | 2/2016 | Marino | B29C 64/393 |
| | | | 425/150 |
| 2016/0271367 A1* | 9/2016 | Hyde | A61L 27/38 |
| 2016/0318260 A1* | 11/2016 | Hyde | B33Y 10/00 |
| 2016/0368207 A1* | 12/2016 | Hyde | B33Y 40/00 |
| 2017/0129186 A1* | 5/2017 | Sauti | B29C 64/106 |

(Continued)

FOREIGN PATENT DOCUMENTS

| CN | 207535311 U * | 6/2018 | B29C 64/209 |
|---|---|---|---|
| CN | 106393676 B * | 5/2019 | B33Y 30/00 |

(Continued)

OTHER PUBLICATIONS

Rao et al, Online Real-Time Quality Monitoring in Additive Manufacturing Processes Using Heterogeneous Sensors, Journal of Manufacturing Science and Engineering, Dec. 2015, vol. 137 (Year: 2015).*

(Continued)

*Primary Examiner* — David L Singer
(74) *Attorney, Agent, or Firm* — Jacob M. Ward; Ward Law Office LLC

(57) ABSTRACT

The present invention discloses a hard-mounted nozzle (106) accelerometer (112) that includes a PCB (102) with an integrated accelerometer (112) for testing resonance in 3D printers with a nozzle (106) fastening feature. The hole in the PCB (102) is designed to fasten the device directly onto the heater block (101) with the nozzle (106) or other fastener "hard mounting", which eliminates the need for additional hardware and reduces installation complexity. The device can be easily installed and removed from the heater block (101) with the nozzle (106) without the need for additional tools. The microcontroller (110) analyzes the vibration data to determine the resonance frequency of the printer. The assembly, provides an accurate and reliable method for testing resonance in 3D printers, which can improve print quality, reduce print failures, and prevent hardware damage.

5 Claims, 8 Drawing Sheets

(56) References Cited

U.S. PATENT DOCUMENTS

| | | | | |
|---|---|---|---|---|
| 2018/0290384 | A1* | 10/2018 | Hyde | B33Y 40/10 |
| 2018/0297290 | A1* | 10/2018 | Eyal | B29C 64/209 |
| 2019/0270253 | A1* | 9/2019 | Levi | B29C 64/343 |
| 2021/0008790 | A1* | 1/2021 | Han | B29C 64/232 |
| 2021/0154916 | A1* | 5/2021 | Kazmer | B29C 64/118 |
| 2021/0323054 | A1* | 10/2021 | Gibson | B33Y 10/00 |

FOREIGN PATENT DOCUMENTS

| | | | | |
|---|---|---|---|---|
| CN | 110142973 A | * | 8/2019 | B29C 54/393 |
| CN | 111376476 A | * | 7/2020 | B22F 3/115 |

OTHER PUBLICATIONS

Jhodkar et al, Experimental investigation of nozzle clogging using vibration signal-based condition monitoring for fused deposition modeling, 2021 (Year: 2021).*

Li et al, Experimental investigation using vibration testing method to optimize feed parameters of color mixing nozzle for fused deposition modeling color 3D, Advances in Mechanical Engineering, 2019, vol. 11(12) 1-12 (Year: 2019).*

Isiani et al, Fault Detection in 3D Printing: A Study on Sensor Positioning and Vibrational Patterns, Sensors 2023, 23, 7524 (Year: 2023).*

Edoimioya et al, A Generalized and Efficient Control-Oriented Modeling Approach for Vibration-Prone Delta 3D Printers Using Receptance Coupling, IEEE Xplore, 2022 (Year: 2022).*

Tlegenov et al, Nozzle condition monitoring in 3D printing, Robotics and Computer Integrated Manufacturing 54 (2018) 45-55 (Year: 2018).*

Tlegenov, Thesis: Model-Based Monitoring of Nozzle Clogging in Fused Deposition Modelling Process, Department of Mechanical Engineering National University of Singapore (Year: 2018).*

Kazhymurat et al, IoT-Based Real-Time 3D Printing Monitoring System, 2022 Smart Information Systems and Technologies (SIST) (Year: 2022).*

Becker et al, Online Error Detection in Additive Manufacturing: A Review, 2021 IEEE 8th International Conference on Industrial Engineering and Applications (Year: 2021).*

Li et al, In-Situ Monitoring and Diagnosing for Fused Filament Fabrication Process Based on Vibration Sensors, Sensors 2019, 19, 2589 (Year: 2019).*

Measuring Resonances—Klipper documentation, retrieved from The Wayback Machine—https://web.archive.org/web/20230610013605/https://www.klipper3d.org/Measuring_Resonances.html (Year: 2023).*

Hotend Accelerometer Probe PCB Board REV 6A, retrieved from The Wayback Machine—https://web.archive.org/web/20200919214228/https://www.seemecnc.com/products/hotend-accelerometer-probe-pcb-board (Year: 2020).*

Seidle et al, OpenLog Artemis Hookup Guide, SparkFun (Year: 2020).*

Analog Devices, High Performance Wide Bandwidth Accelerometer Evaluation Board EVAL-ADXL001, 2009 (Year: 2009).*

Arduino and MPU6050 Accelerometer and Gyroscope Tutorial, HowToMechatronics, retrieved from The Wayback Machine—https://web.archive.org/web/20190520064311/https://howtomechatronics.com/tutorials/arduino/arduino-and-mpu6050-accelerometer-and-gyroscope-tutorial/ (Year: 2019).*

Analog Devices, MEMS-Based Vibration Analyzer with Frequency Response Compensation Circuit Note CN-0303, 2013 (Year: 2013).*

Geneb, 2018 HE280 Assembly, SeeMeCNC Guides, 2018, webpage <https://seemecnc.dozuki.com/Guide/2018+HE280+Assembly/91?lang=en>, 17 pages (Year: 2018).*

Mishra et al, Comparative study of vibration signatures of FDM 3D printers, Progress in Additive Manufacturing vol. 8, pp. 205-209, Short Communication Published: Jul. 20, 2022 (Year: 2022).*

\* cited by examiner

HARD MOUNTED NOZZLE ACCELEROMETER

TECHNICAL FIELD

The present invention relates to relate to methods, apparatus and systems for measuring the angular orientation of a rotating object about a point. More particularly, this invention relates to a hard-mounted accelerometer is a motion-sensing device securely fixed in place to the block with the nozzle or other fastener to the 3-dimensional machine, to measure and record acceleration/Vibration data.

BACKGROUND

The following description includes information that may be useful in understanding the present invention. It is not an admission that any of the information provided herein is prior art or relevant to the presently claimed invention, or that any publication specifically or implicitly referenced is prior art.

Three-dimensional (3D) printing (e.g., additive manufacturing) is a process for making three-dimensional (3D) objects of any shape from a design. The design may be in the form of a data source such as an electronic data source or may be in the form of a hard copy. The hard copy may be a two-dimensional representation of a 3D object. The data source may be an electronic 3D model. 3D printing may be accomplished through an additive process in which successive layers of material are laid down one on top of each other. This process may be controlled (e.g., computer controlled, manually controlled, or both). A 3D printer can be an industrial robot.

3D printing can generate custom parts quickly and efficiently. A variety of materials can be used in a 3D printing process including elemental metal, metal alloy, ceramic, elemental carbon, resin, or polymeric material. In a typical additive 3D printing process, a first material-layer is formed, and thereafter, successive material-layers (or parts thereof) are added one by one, wherein each new material-layer is added on a pre-formed material-layer, until the entire designed three-dimensional structure (3D object) is materialized.

3D models may be created utilizing a computer aided design package or via 3D scanner. The manual modeling process of preparing geometric data for 3D computer graphics may be similar to plastic arts, such as sculpting or animating. 3D scanning is a process of analyzing and collecting digital data on the shape and appearance of a real object. Based on this data, 3D models of the scanned object can be produced. The 3D models may include computer-aided design (CAD).

Many additive processes are currently available. They may differ in the manner layers are deposited to create the materialized structure. They may vary in the material or materials that are used to generate the designed structure. Some methods melt or soften material to produce the layers. Examples for 3D printing methods include selective laser melting (SLM), selective laser sintering (SLS), direct metal laser sintering (DMLS), shape deposition manufacturing (SDM) or fused deposition modeling (FDM). Other methods cure liquid materials using different technologies such as stereo lithography (SLA). In the method of laminated object manufacturing (LOM), thin layers (made inter alia of paper, polymer, metal) are cut to shape and joined together.

Resonance is a critical factor in the quality of 3D prints, and it can significantly affect the accuracy and precision of printed parts. Traditional methods of measuring resonance in 3D printers involve complex equipment and expensive sensors. To overcome these limitations, the present invention provides a PCB with an integrated accelerometer for testing resonance in 3D printers with a nozzle fastening feature. By looking at prior art and users' requirements, the current assembly discusses an improved hard-mounted accelerometer i.e., a motion-sensing device securely fixed in place to the block with the nozzle or other fastener to the 3-dimensional machine, to measure and record acceleration/vibration data and provides a compact and efficient solution for measuring resonance in 3D printers.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

Addressing these limitations and creating a holistic platform that encompasses training, dating, forums, and online sessions specifically tailored to the university environment are crucial. As a result, there exists a need for improvements over the prior art and more particularly for a more efficient way.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

It is a general object of the present invention to provide an improved form of accelerometer-based system for testing resonance in 3D printers, or other machines.

It is a principal objective of the invention to provide a compact and efficient solution for measuring resonance in 3D printers by utilizing an accelerometer sensor integrated into a printed circuit board (PCB).

It is another object to provide an improved, convenient, fast, safe, and effective, wherein the PCB is designed with a hole to fasten the device directly onto the heater block with the nozzle, which eliminates the need for additional hardware and reduces installation complexity.

It is another object to disclose a method to provide a motion-sensing device i.e., securely fixed in place to the block with the nozzle or other fastener to the 3-dimensional machine, to measure and record acceleration/vibration data.

It is another object to disclose a method to provide an accelerometer directly onto the surface of the test object providing a more accurate, sensitive, and stable measurement compared to plastic mounting and providing the best results where accuracy and sensitivity are critical.

Other aspects, advantages and novel features of the present invention will become apparent from the detailed description of the invention when considered in conjunction with the accompanying drawings.

This Summary is provided merely for the purpose of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

The diagrams are for illustration only, which thus is not a limitation of the present disclosure, and wherein.

Figure 1:
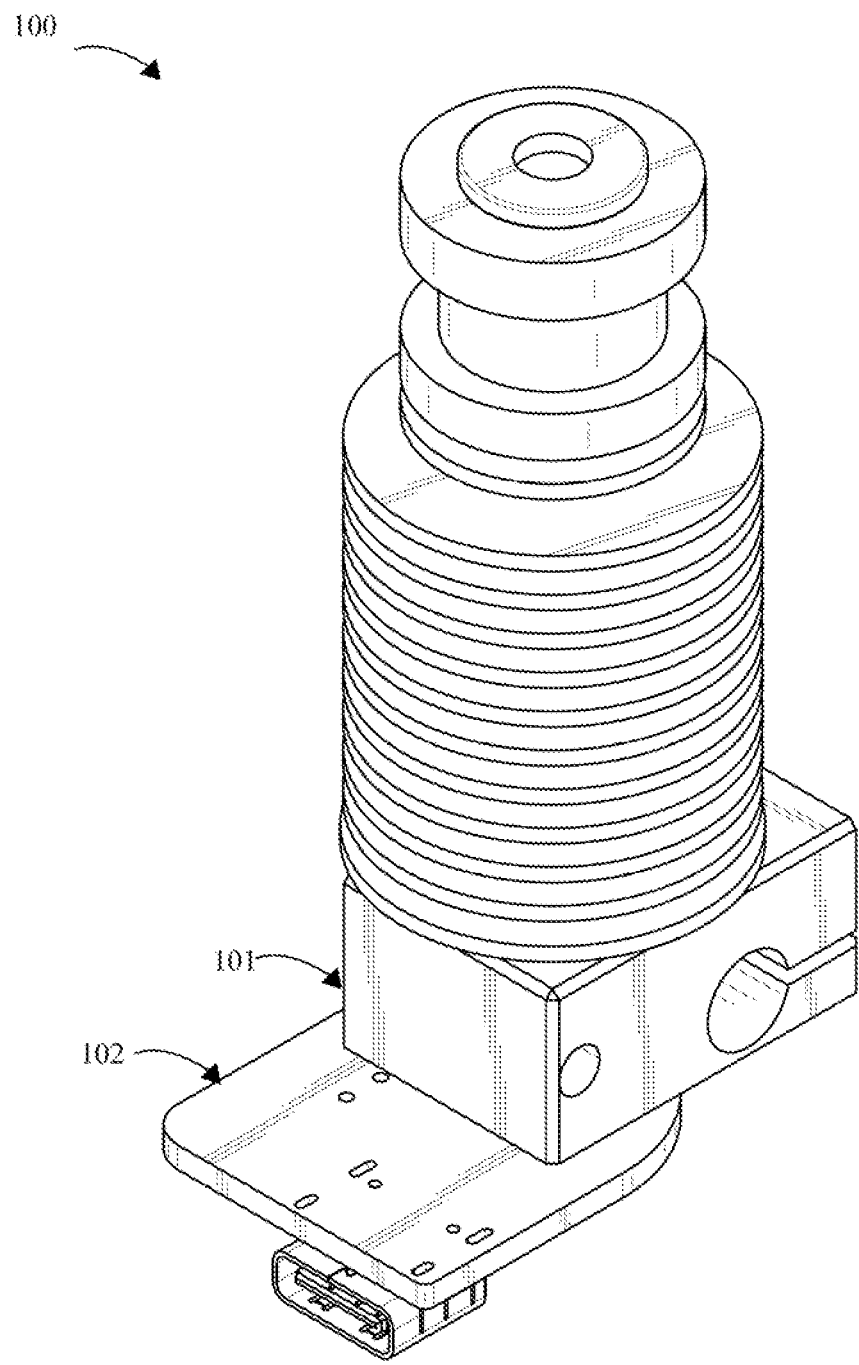
FIG. 1 is a perspective view of a hard mounted nozzle accelerometer, in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF DRAWINGS

Those skilled in the art will understand that when an element or part in the drawings is referred to as being "on" (or "connected" to or "coupled" to or "attached" to) another element, it can be directly on (or attached to) the other element or intervening elements may also be present. Furthermore, relative terms such as "inner", "outer", "upper", "above", "lower", "beneath", and "below", and similar terms, may be used herein to describe a relationship of one element to another element. It is understood that these terms are intended to encompass different orientations of the device in addition to the orientation depicted in the figures.

To make the objectives, technical solutions, and advantages of this application clearer, the following clearly and completely describes the technical solutions in this application with reference to accompanying drawings in this application. Obviously, described embodiments are a part rather than all of embodiments of this application. All other embodiments obtained by a person of ordinary skill in the art based on embodiments of this application without creative efforts shall fall within the protection scope of this application.

It should be understood that in this application, "at least one (item)" refers to one or more and "a plurality of" refers to two or more. The term "and/or" is used to describe an association relationship between associated objects and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof means any combination of these items, including a single item (piece) or any combination of a plurality of items (pieces). For example, at least one item (piece) of a, b, or c may indicate a, b, c, a and b, a and c, b and c, or a, b, and c, where a, b, and c may be singular or plural.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 2:
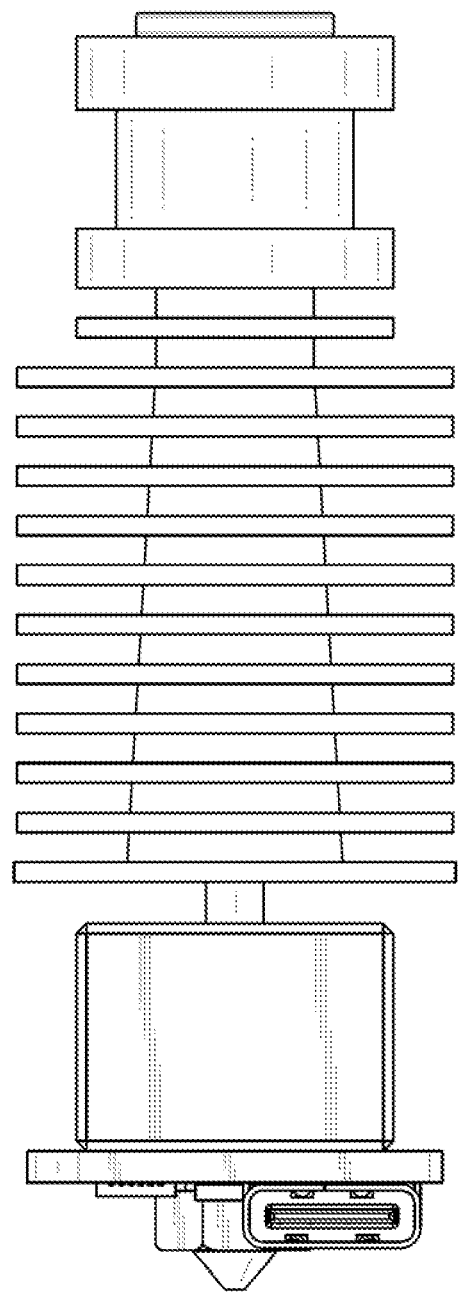
FIG. 2 is a front view of a hard mounted nozzle accelerometer, in accordance with an embodiment of the present invention my new design.
Figure 3:
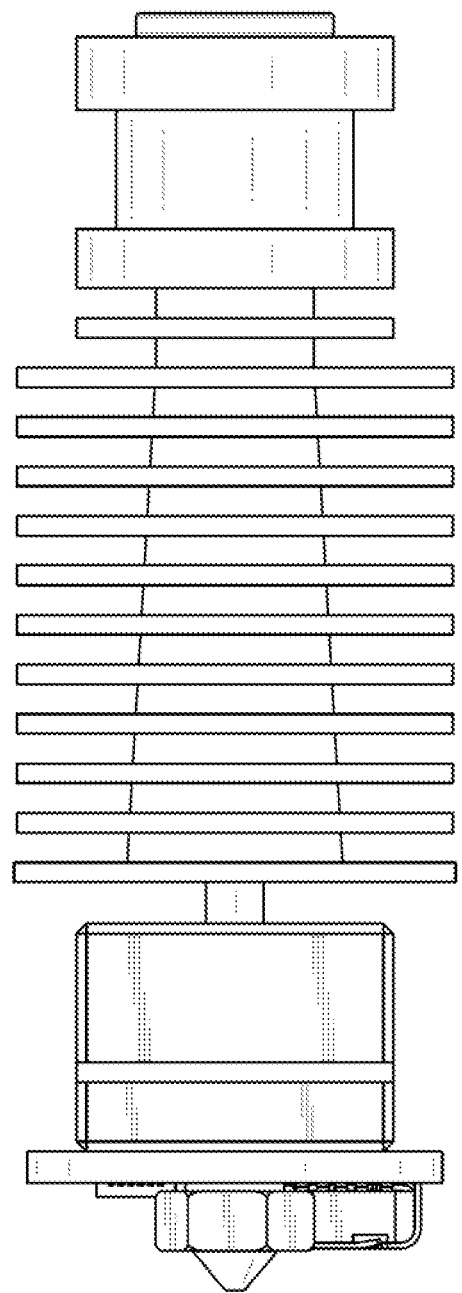
FIG. 3 is a back view of a hard mounted nozzle accelerometer, in accordance with an embodiment of the present invention.
Figure 4:
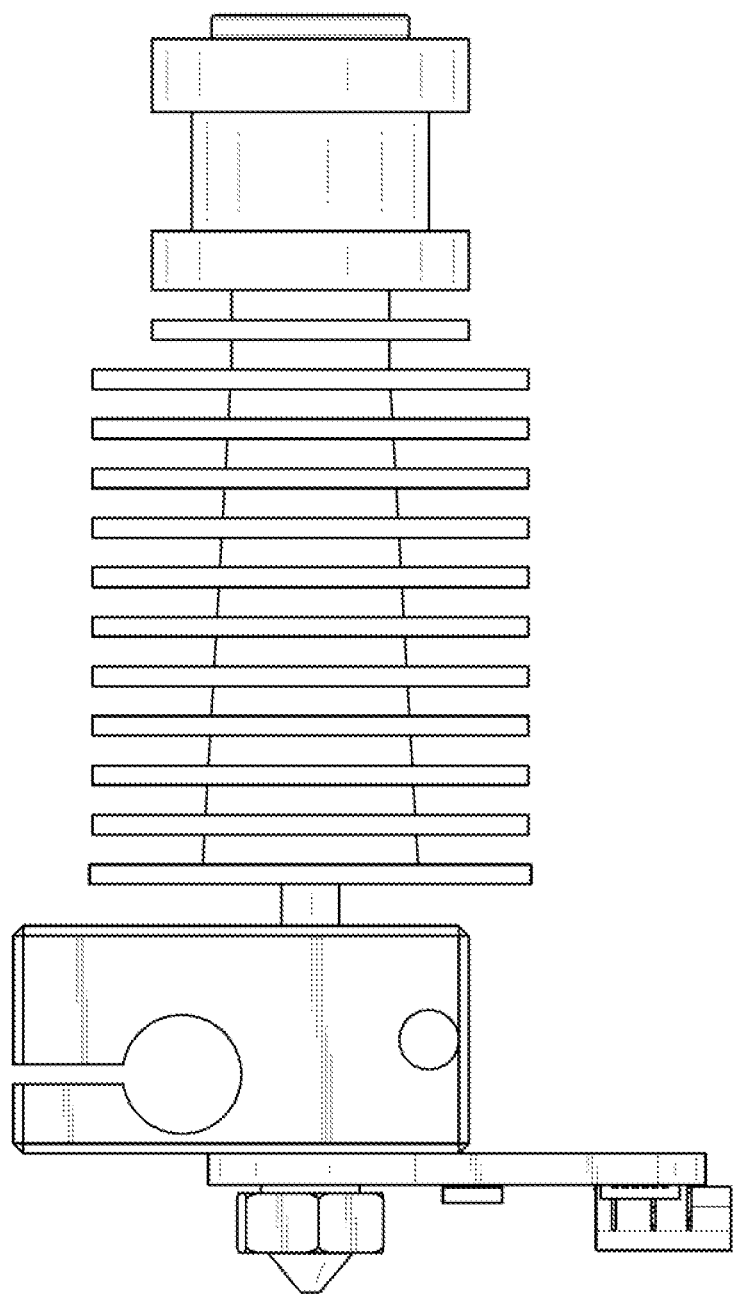
FIG. 4 shows a working view of a hard mounted nozzle accelerometer, in accordance with an embodiment of the present invention.
Figure 5:
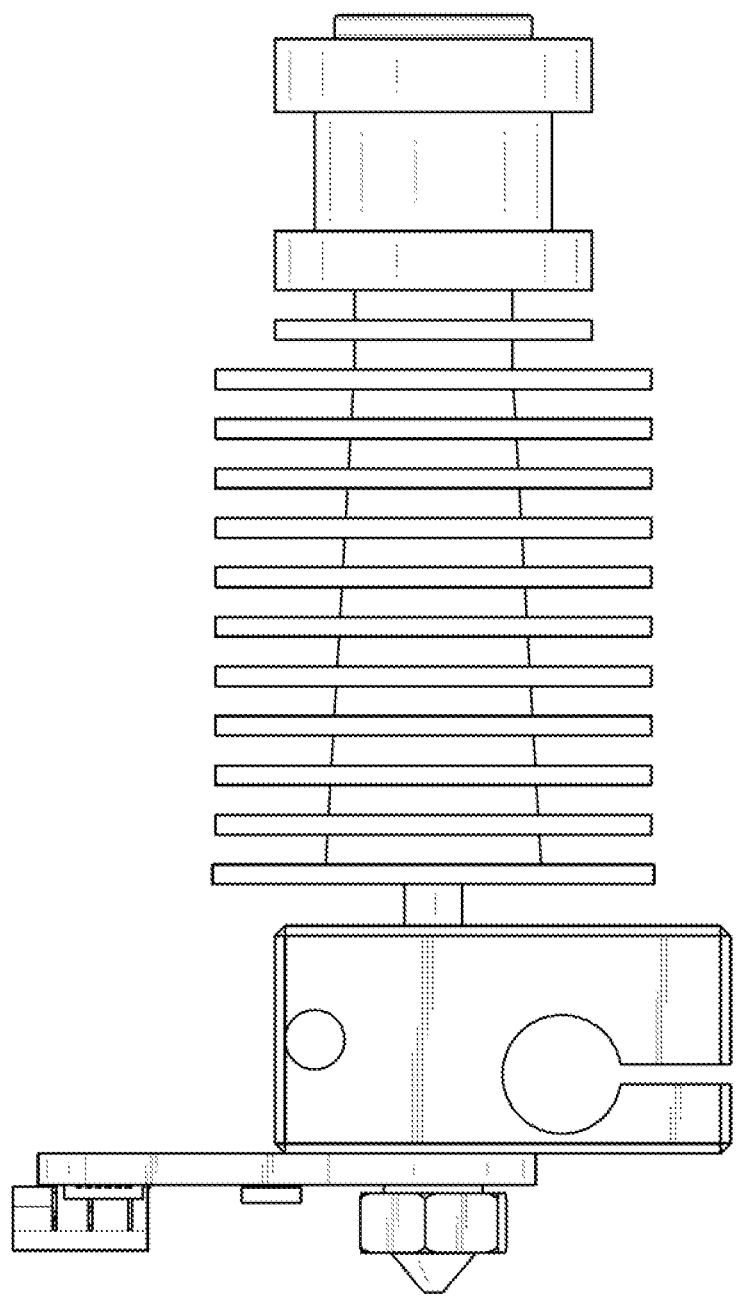
FIG. 5 shows another working view of a hard mounted nozzle accelerometer, in accordance with an embodiment of the present invention.
Figure 6:
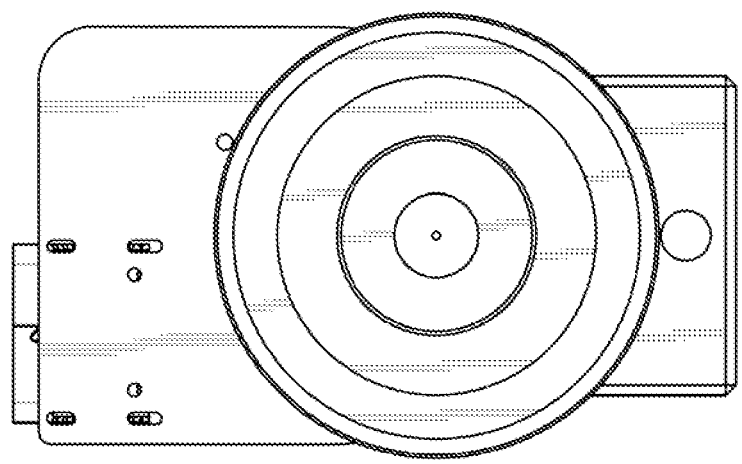
FIG. 6 shows the top view of a hard mounted nozzle accelerometer, in accordance with an embodiment of the present invention.
Figure 7:
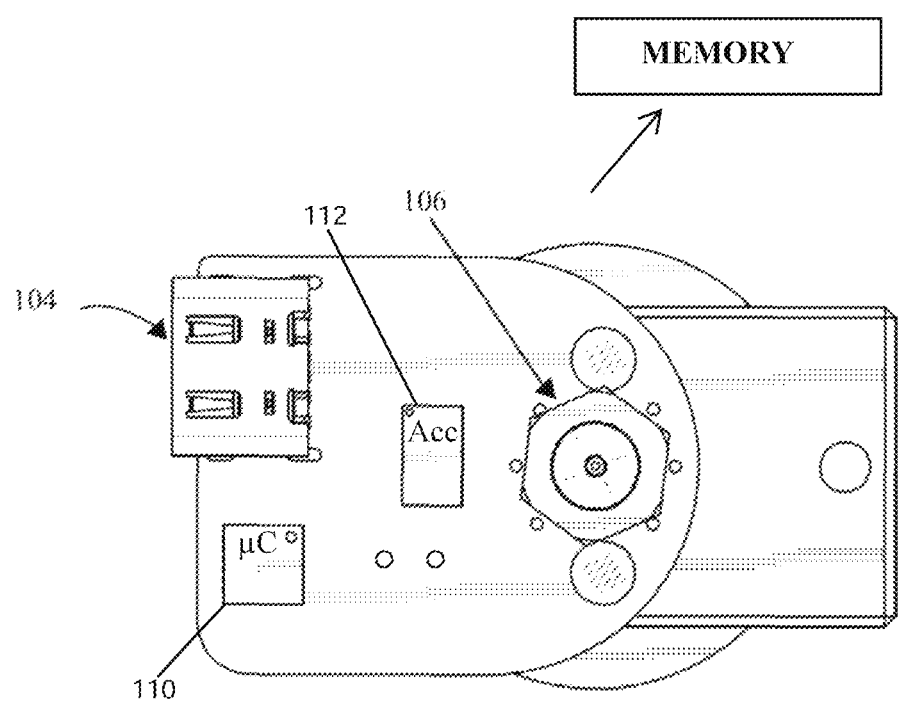
FIG. 7 shows the bottom view of a hard mounted nozzle accelerometer, in accordance with an embodiment of the present invention.
Figure 8:
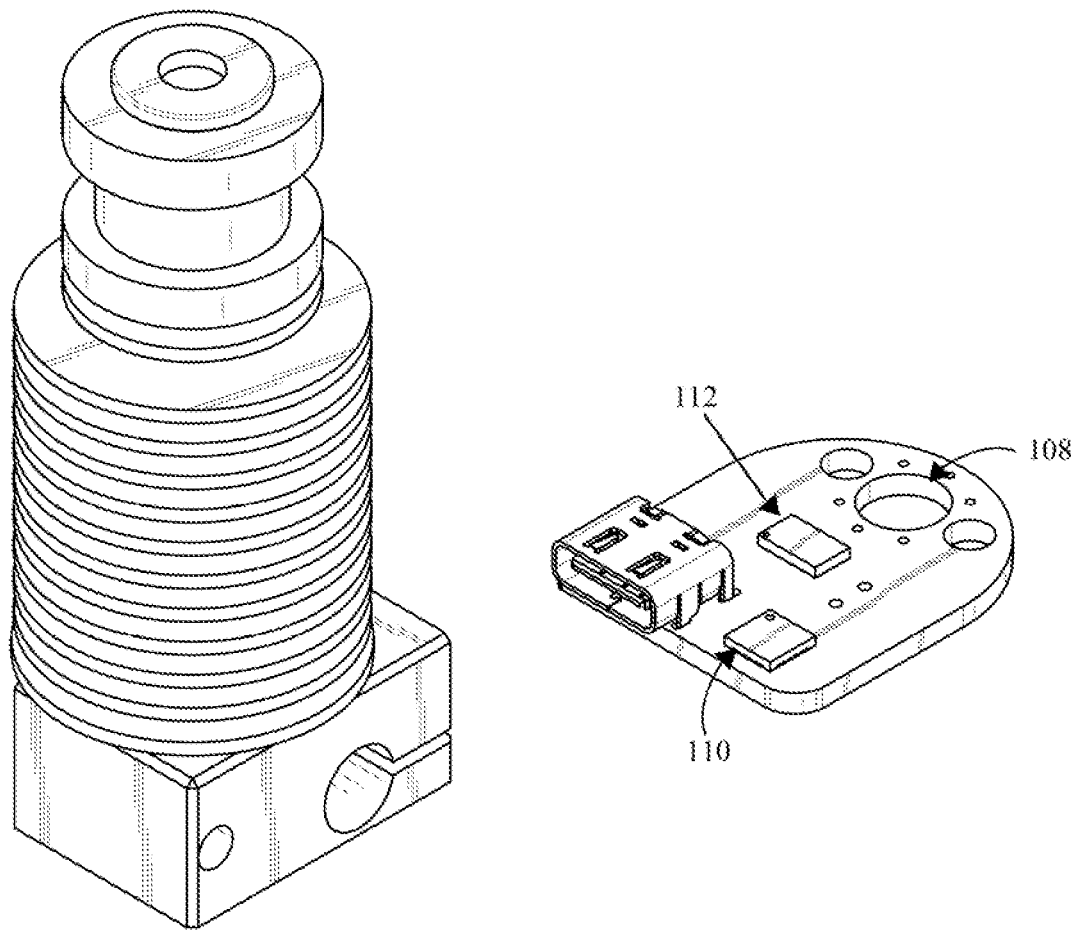
FIG. 8 shows exploded view of a hard mounted nozzle accelerometer, in accordance with an embodiment of the present invention.

The present invention is directed to providing a motion-sensing device securely fixed in place to the block with the nozzle or other fastener to the 3-dimensional machine, to measure and record acceleration/vibration data as illustrated in FIG. 1-8.

Accelerometers can find applications in many areas of technologies. For example, in the automotive industry, acceleration sensing is commonly used for airbag deployment. The computer industry utilizes accelerometers to protect hard disks from large shocks, and the aerospace industry employs inertial measurement units comprising multiple accelerometers and gyroscopes for sensing and navigation. Accelerometers are also used in many personal handheld devices as well, where they can detect the general orientation of the devices.

FIGS. 1-8 illustrates an accelerometer-based system (100) that includes an accelerometer (112) or motion sensor and a microcontroller (110). The accelerometer (112) is integrated directly into a PCB (102), which is designed with a hole (108) to fasten the device directly onto the heater block (101) with the nozzle (106) or other fastener "Hard mounting". Measuring resonance closer to the tool is better because it provides more accurate data on the vibration patterns generated by the tool. It also reduces the impact of external factors on the measurement, enabling better quality control and improved performance of the printer. The microcontroller (110) is responsible for processing the vibration data and converting it into resonance frequency information.

The hole (108) in the PCB (102) is designed to fasten the device directly onto the heater block (101) with the nozzle (106) or other fastener "hard mounting", which eliminates the need for additional hardware and reduces installation complexity. The device can be easily installed and removed from the heater block (101) with the nozzle (106) without the need for additional tools. When it comes to mounting an accelerometer, hard mounting is generally considered to be a better option compared to using plastic mounting because of various reasons.

In another embodiment, the 3D device involves better accuracy, wherein the hard mounting an accelerometer directly onto the surface of the test object provides a more accurate measurement of the vibration. This is because the accelerometer is in direct contact with the object, and there is no potential for the accelerometer to shift or move during testing, which could introduce errors in the measurement. In contrast, plastic mounting can introduce some flexibility or movement between the accelerometer and the test object, which can lead to inaccuracies in the measurement.

In another embodiment, the hard-mounted accelerometer (112) provides increased sensitivity. The hard mounting an accelerometer (112) can increase its sensitivity to low-level vibrations. By mounting the accelerometer (112) directly onto the surface of the test object, it can pick up even subtle vibrations that might not be detected using a plastic mounting. This can be particularly important for applications where precise measurement of low-level vibrations is critical.

In another embodiment, the hard-mounted accelerometer (112) provides more stable readings. The hard mounting can provide more stable readings over time, wherein with time, the plastic used in mounting can become deformed or degraded, which can impact the accuracy of the measurement. Hard mounting, on the other hand, is generally more durable and can provide stable readings over a longer period of time.

In another embodiment, the hard-mounted accelerometer (112) provides better repeatability of measurements. By ensuring that the accelerometer (112) is in direct contact with the test object and is not prone to shifting or movement, the measurements can be more consistent and repeatable over multiple tests. This can be particularly important for applications where consistent and repeatable measurements are critical.

In another embodiment, the accelerometer (112) of the PCB (102) is designed to measure the vibration caused by resonance. The microcontroller (110) analyzes the vibration data to determine the resonance frequency of the printer. The USB-C connection interface (104) on the PCB (102) provides a convenient and reliable way to connect the accelerometer sensor (112) to other devices, enabling the user to access and analyze the data collected by the sensor for various applications.

While a specific embodiment has been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment.

A computer or any other computing device connected to the network is used for determining the resonance of the 3D printer or printing device. The computer system has a processing unit, a memory for storage, Network Interface Unit, I/O unit and a display device. The at least one processor may be implemented as one or more microprocessors, microcomputers, microcontroller (110), digital signal processors, central processing units, state machines, logic circuitries, and/or any devices that manipulate signals based on operational instructions. Among other capabilities, at least one processor is configured to fetch and execute computer-readable instructions stored in the memory.

As used herein, the term tool, system and method may refer to software, firmware, hardware, or other component that can be used to effectuate a purpose. The engine will typically include software instructions that are stored in non-volatile memory (also referred to as secondary memory). When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

The I/O device may comprise one or more I/O devices, such as a keyboard, touch screen, stylus, microphone, speaker, scanner, and/or the like.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include modules, routines, programs, objects, components, data structures, etc., of encryption.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

While the subject invention is described and illustrated with respect to certain preferred and alternative embodiments, it should be understood that various modifications can be made to those embodiments without departing from the subject invention, the scope of which is defined in the following claims.

The invention claimed is:

1. A 3D printer comprising:
   a printed circuit board (PCB);
   an accelerometer integrated into the PCB, wherein the accelerometer is configured to measure and record vibration data of the PCB;
   a microcontroller configured to analyze the vibration data of the PCB to determine a resonance frequency of the 3D printer;
   a heater block; and
   a nozzle;
   wherein the PCB includes a hole, and
   wherein the PCB is hard mounted directly to the heater block with the nozzle through the hole.

2. The 3D printer of claim 1, wherein the PCB is configured to be installed at and removed from the heater block using the nozzle.

3. A method of determining resonance in a 3D printer comprising the steps of:
   mounting an accelerometer to a heater block of the 3D printer, wherein the accelerometer is integrated into a printed circuit board (PCB), wherein the PCB includes a hole and wherein the PCB is hard mounted directly to the heater block with the 3D printer nozzle through the PCB hole;
   measuring and analyzing vibration data of the heater block and the nozzle, the nozzle in operation, using the accelerometer; and
   determining a resonance frequency of the 3D printer.

4. The method of claim 3, further comprising removing the accelerometer from the heater block of the 3D printer.

5. The method of claim 3, wherein the resonance frequency of the 3D printer is utilized in the printing of a product by the 3D printer.

* * * * *